Jan. 9, 1923.
W. E. WILLIAMS.
DISK DEMOUNTABLE WHEEL FOR AUTOMOBILES.
FILED APR. 1, 1922.
1,441,771.
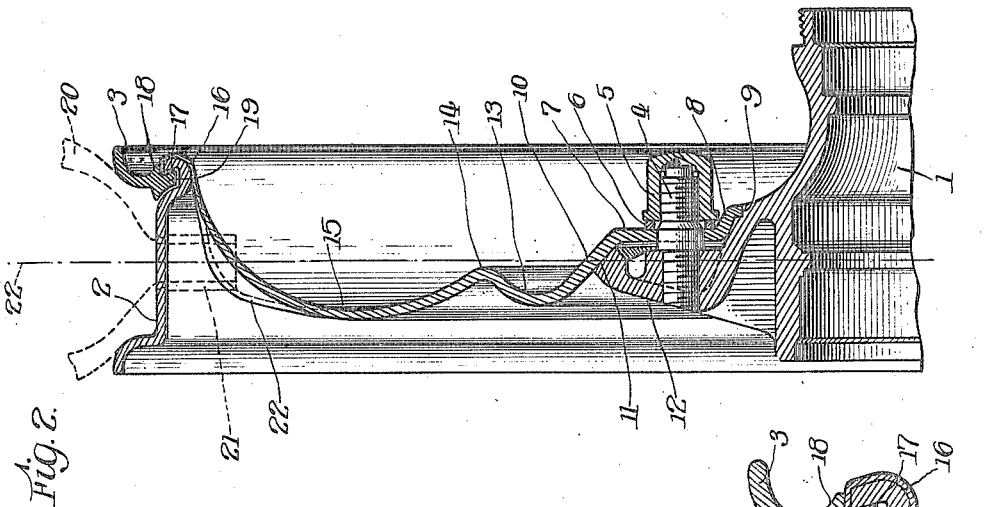
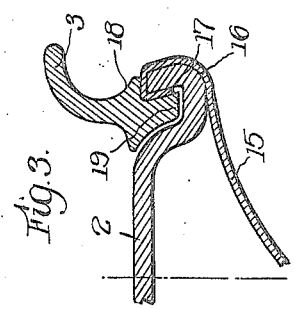
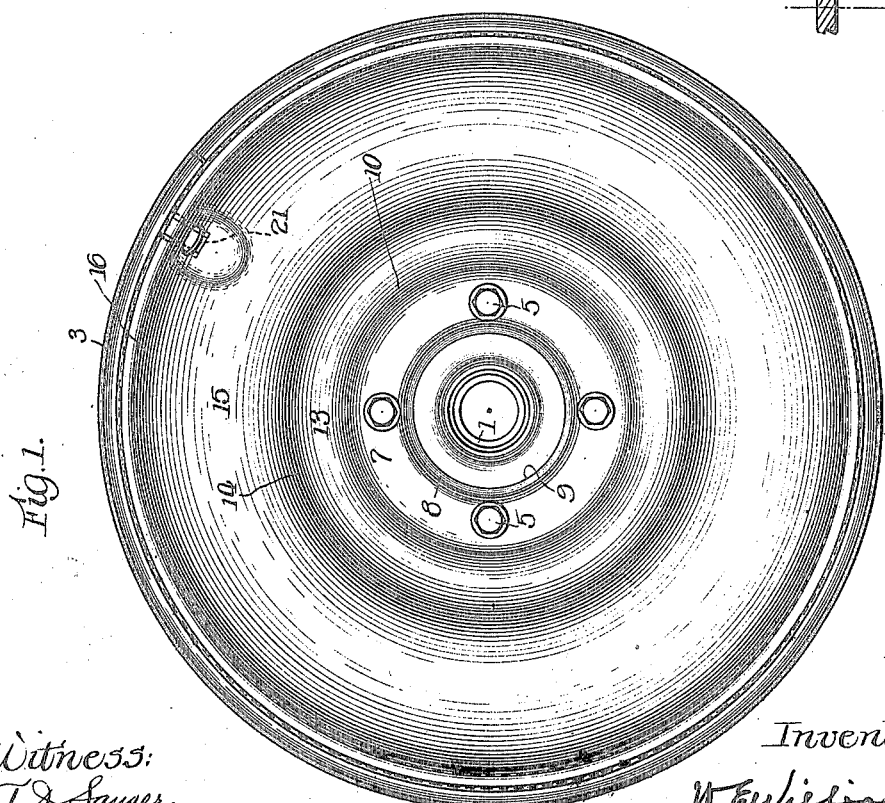
Witness:
A. J. Sauser.
Inventor:
W. E. Williams Patented Jan. 9, 1923.

1,441,771

UNITED STATES PATENT OFFICE.

WILLIAM ERASTUS WILLIAMS, OF WILMETTE, ILLINOIS.

DISK-DEMOUNTABLE WHEEL FOR AUTOMOBILES.

Original application filed July 26, 1920, Serial No. 398,928. Divided and this application filed April 1, 1922. Serial No. 548,620.

*To all whom it may concern:*

Be it known that I, WILLIAM ERASTUS WILLIAMS, a citizen of the United States, a resident of Wilmette, in the county of Cook and State of Illinois, have invented a new and useful Improvement in Disk-Demountable Wheels for Automobiles, of which the following is a specification.

This is filed as a divisional application of Serial No. 398,928, filed July 26th, 1920, entitled Vehicle disk wheels.

The object of my invention is to provide a disk wheel that provides a strong, durable wheel, one that may be cheaply made and cheaply and securely fastened to the rim and one which provides special detailed features of merit as will be hereinafter described.

Reference will be had to the accompanying drawings in which Figure 1 is a front elevation of a wheel.

Figure 2 is a sectional elevation of half of the wheel.

Figure 3 is a sectional detail of the rim fastening.

In the drawing 1 represents the hub of a demountable wheel herein shown as being that of a front wheel, but in so far as the fastening of the disk to the hub is concerned the same fastenings for securing the disks to the hub will be provided for in the rear wheel. 2 indicates the rim of the wheel, being of a type that is used for pneumatic tires.

3 indicates the detachable side ring or flange of a well known pattern which permits the placement and removal of what is known as straight side tires upon the rim 2. The web or disk of the wheel is made of a disk having in radial section a tapering outline being thicker around the hub zone and thinner on the margin where it joins the rim and it is secured to the hub by screw studs 4 passing through its zone 7 and provided with nuts 5 and locking washers 6. The portion 7 has a marginal stiffening flange 8 with its edge abutting an annular hub shoulder 9, and on its peripheral side it merges into an inclined-surface zone 10 seated like a cone-clutch on the annular inclined face 11 of a hub flange 12. The zone 10 merges into an outwardly concave annular portion 13 which is integral with an outwardly convex annular rib 14, which is, in turn continuous with a broad outwardly concave zone 15 extending to meet the peripherally and obliquely grooved rim 2 at its marginal rib 16 around which the marginal portion of the disk is bent, with its termnal portion forming a flange 17 which is engaged in the inclined rim groove. The margin or projection 19 of the side ring 3 enters the groove alongside the flange 17 and has upon its outer side, a little outside the groove, an annular rib 18 which rest upon the in-turned portion of the disk. Tire inflation presses the part 19 firmly against the flange 17 and at the same time draws the bead or rib 18 inward to grip the web or disk, and the load adds to this effect and aids in securing the disk to the rim.

In order to provide for supplying air to the tire when it is mounted on the wheel I provide an aperture in the center of the rim into which there is secured a tube 21 shown in dotted lines, which extends down into the concave zone 15 along the center line 22 of the wheel, and to better accomodate access to this valve stem I press a small depression into the concave zone 15, which depression is indicated by 22. Thus the air valve may protrude through this tube 21 and extend out to the front side or face of the wheel to allow the air to be fed to the tires while the wheel is on the car and from the front face while using what is known as the straight air stem for the pneumatic tubes of the tire.

This method of securing the disk to the rim provides for transmitting load strains from the rim through the contact at 16 to the disk, which thus receives below the axle, compression as do the spokes of a wood wheel. At the same time the lateral engagement of the bent disk over the peripheral surface of a part of the rim gives load tension on the disk above the axle. All this is accomplished without forming undesirable joints, the rim and disk serving, as if integral, to resist all load strains. The construction further gives approximate rigidity, yet with slight elasticity; the flange 17 is readily formed by dies or by spinning; the convolutions aid in resisting lateral or skid strains; and strains are distributed to an unusually large fraction of the wheel's entire metal.

The metal of my disk is made thicker at the hub zone and tapers to a rather thin section at the margin of the disk where it is turned over into the groove of the rim. This provides the skid shock strength and a suitable amount of metal around the hub to properly carry the loads involved in wheel construction without carrying an excess weight of metal around the margin of the wheel.

What I claim is:—

1. In a wheel of the class described, a rim having a detachable side ring secured to the rim by the rim being provided with an annular groove and the side ring provided with an annular projection adapted to fit into the groove; in combination with the web of the wheel in the form of a disk spun over into the said groove in the rim, and with the said side ring seated against the turned over projection of the margin of the disk.

2. In a wheel of the class described, a rim adapted to carry a pneumatic tire and provided with an annular groove into which there is seated and properly fitted a detachable side flange, a disk forming the web of the wheel having its margin turned over and seated into this groove of the rim.

3. In a device of the class described, the combination with a wheel rim, of an outwardly concave dished disk provided with an offset fitting against the inner face of the rim and another offset fitting over and engaging the outer side of the rim, whereby the two offsets enable the disk to resist both compression and tension strains.

4. In a device of the class described, a disk forming the web of the wheel united to the rim thereof by having its margin turned over to embrace the edge of the rim; in combination with a detachable side ring of the rim seated on to the turned over portion of the margin of the disk.

5. In a device of the class described, the combination with a rim member having at one side an annular outwardly open groove in its periphery, of a disk thicker at the hub and tapering in outline toward the margin and having its thin margin spun over into said groove of the rim in a manner securing the rim to the disk.

6. In a device of the class described, a tapered disk being thicker around the hub and tapering toward the margin, and having the margin of the disk secured to the rim by the disk margin embracing both the inside and the outside of the edge of the rim member.

7. In a device of the class described, a disk for the web of the wheel having a thicker portion surrounding the hub zone and a thinner marginal portion, and the marginal portion secured to the rim by being bent laterally over the outer face of a portion of the rim.

8. In a device of the class described, a disk forming the web of the wheel, dished inward to allow for the entrance of a straight valve stem of a pneumatic tire through an aperture in the rim and through an aperture in the disk and with the margin of the disk extending over to a contact and fastening with the rim and said fastening composed of a locking together of the parts by having the margin of the disk turned over into a locking contact with the rim portion.

9. The combination with a main rim member having an annular peripheral groove and forming the tread of a wheel, of a wheel disk having its marginal portion turned over into said groove and a tire-holding side flange having an annular projection extending into said groove alongside said marginal portion.

Signed at Chicago in the county of Cook and State of Illinois, this 25th day of March, 1922.

WILLIAM ERASTUS WILLIAMS.

Witnesses:—
Jos. E. Love,
F. M. Zobel.